US007299874B2

(12) United States Patent
Welton et al.

(10) Patent No.: US 7,299,874 B2
(45) Date of Patent: *Nov. 27, 2007

(54) VISCOELASTIC SURFACTANT FLUIDS AND ASSOCIATED METHODS

(75) Inventors: Thomas D. Welton, Duncan, OK (US); Samuel J. Lewis, Duncan, OK (US); Gary P. Funkhouser, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 208 days.

This patent is subject to a terminal disclaimer.

(21) Appl. No.: 11/058,660

(22) Filed: Feb. 15, 2005

(65) Prior Publication Data

US 2006/0180310 A1 Aug. 17, 2006

(51) Int. Cl.
*E21B 43/28* (2006.01)
(52) U.S. Cl. ........................ 166/307; 166/282; 507/259
(58) Field of Classification Search ..................... None
See application file for complete search history.

(56) References Cited

U.S. PATENT DOCUMENTS

| | | | | |
|---|---|---|---|---|
| 4,061,580 | A | 12/1977 | Jahnke | 252/8.55 R |
| 4,215,001 | A | 7/1980 | Elphingstone et al. | 252/8.55 C |
| 4,324,669 | A | 4/1982 | Norman et al. | 252/8.55 C |
| 4,495,389 | A | 1/1985 | Place | 200/83 P |
| 4,591,447 | A | 5/1986 | Kubala | 252/8.55 C |
| 4,737,296 | A | 4/1988 | Watkins | 252/8.553 |
| 5,009,799 | A | 4/1991 | Syrinek et al. | 252/8.553 |
| 5,551,516 | A | 9/1996 | Norman et al. | 166/308 |
| 5,797,456 | A | 8/1998 | Mokadam | |
| 5,964,295 | A | 10/1999 | Brown et al. | 166/308 |
| 5,979,557 | A | 11/1999 | Card et al. | |
| 6,035,936 | A | 3/2000 | Whalen | |
| 6,258,859 | B1 | 7/2001 | Dahayanake et al. | 516/77 |
| 6,399,546 | B1 | 6/2002 | Chang et al. | 507/240 |

(Continued)

FOREIGN PATENT DOCUMENTS

| | | | |
|---|---|---|---|
| GB | 2 389 603 | A | 8/2002 |

(Continued)

OTHER PUBLICATIONS

Foreign commucation related to a counter part dated Jul. 4, 2006.

*Primary Examiner*—Jennifer H. Gay
*Assistant Examiner*—Kerry W. Leonard
(74) *Attorney, Agent, or Firm*—Robert A. Kent; Baker Botts

(57) ABSTRACT

Provided are treatment fluids that comprise an aqueous based fluid, a water-soluble salt, and a methyl ester sulfonate surfactant, and associated methods. In one embodiment, a method of treating a subterranean formation is provided, the method comprising: providing a treatment fluid comprising an aqueous base fluid, a water-soluble salt, and a methyl ester sulfonate surfactant; and introducing the treatment fluid into a well bore that penetrates the subterranean formation. Also provided are methods of fracturing a subterranean formation, and methods of removing formation particulates from a well bore or a near well bore region. In some instances, the treatment fluids exhibit viscoelastic behavior which may be due, at least in part, to the association of at least a portion of the methyl ester sulfonate surfactant into a plurality of micellar structures.

20 Claims, 3 Drawing Sheets

3.5% SALT
4.0% SALT
4.5% SALT
6.0% SALT
7.0% SALT
SHEAR RATE 82 sec$^{-1}$
VISCOSITY, (cP)
TEMP, (F)

U.S. PATENT DOCUMENTS 6,482,866 B1 11/2002 Dahayanake et al. ......... 516/77
6,491,099 B1 12/2002 Di Lullo Arias et al. ... 166/300
6,667,280 B2 12/2003 Chang et al. ............... 507/240
6,703,352 B2 3/2004 Dahayanake et al. ....... 507/241
2002/0002205 A1 1/2002 Dahayanake et al. ......... 516/77
2002/0048676 A1* 4/2002 McDaniel et al. .......... 428/404
2003/0019627 A1 1/2003 Qu et al. .................... 166/281
2003/0054962 A1 3/2003 England et al. ............. 507/117
2003/0139298 A1 7/2003 Fu et al. ..................... 507/200
2003/0166461 A1 9/2003 Angeletakis et al. ........ 502/159
2003/0236179 A1 12/2003 Bodet et al. ................ 510/475
2004/0009880 A1 1/2004 Fu ............................. 507/200
2004/0023812 A1 2/2004 England et al. ............. 507/100
2004/0045710 A1 3/2004 Fu et al. ..................... 166/282

FOREIGN PATENT DOCUMENTS

GB 2 389 604 A 8/2002
WO WO 03/054350 A1 7/2003

* cited by examiner

VISCOELASTIC SURFACTANT FLUIDS AND ASSOCIATED METHODS

CROSS-REFERENCE TO RELATED APPLICATIONS

The present invention is related to U.S. application Ser. No. 11/058,475, now U.S. Pat. No. 7,159,659, entitled "Viscoelastic Surfactant Fluids and Associated Acidizing Methods," filed concurrently herewith, U.S. application Ser. No. 11/058,612 entitled "Viscoelastic Surfactant Fluids and Associated Diverting Methods," filed concurrently herewith, and U.S. application Ser. No. 11/056.611 entitled "Viscoelastic Surfactant Fluids and Associated Methods," filed concurrently herewith, the entire disclosures of which are incorporated herein by reference.

BACKGROUND

The present invention relates to methods and compositions for treating subterranean formations. More particularly, the present invention relates to treatment fluids that comprise a methyl ester sulfonate ("MES") surfactant, and associated methods.

Viscosified treatment fluids may be used in a variety of subterranean treatments. Such treatments include, but are not limited to, drilling operations, stimulation treatments, and sand control treatments. As used herein, the term "treatment," or "treating," refers to any subterranean operation that uses a fluid in conjunction with a desired function and/or for a desired purpose. The term "treatment," or "treating," does not imply any particular action by the fluid.

Drilling operations typically require the use of a drilling fluid. During drilling operations, a viscosified treatment fluid (e.g., a drilling fluid) passes down through the inside of the drill string, exits through the drill bit, and returns to the drilling rig through the annulus between the drill string and well bore. The circulating drilling fluid, among other things, lubricates the drill bit, transports drill cuttings to the surface, and balances the formation pressure exerted on the well bore. Drilling fluids typically require sufficient viscosity to suspend drill cuttings. Viscosified treatment fluids also may be used in other operations to transport and remove formation particulates from the well bore or the near well bore region. In some instances, these formation particulates may be generated during the course of drilling, digging, blasting, dredging, tunneling, and the like in the subterranean formation.

One common production stimulation operation that employs a viscosified treatment fluid is hydraulic fracturing. Hydraulic fracturing operations generally involve pumping a viscosified treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the viscosity of the fracturing fluid usually is reduced, and the fracturing fluid may be recovered from the formation.

Treatment fluids are also utilized in sand control treatments, such as gravel packing. In gravel-packing treatments, the viscosified treatment fluid suspends particulates (commonly referred to as "gravel particulates") for delivery to a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. In some situations, fracturing and gravel-packing treatments are combined into a single treatment (commonly referred to as "frac pack" operations) to provide stimulated production and an annular gravel pack to reduce formation sand production. In some cases, the treatments are completed with a gravel pack screen assembly in place, and the fracturing treatment fluid being pumped through the annular space between the casing and screen. In such a situation, the fracturing treatment usually ends in a screen-out condition, creating an annular gravel pack between the screen and casing. This allows both the fracturing treatment and gravel pack to be placed in a single operation.

Maintaining sufficient viscosity in these fluids is important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Also, maintaining sufficient viscosity may be important to control and/or reduce leak-off into the formation. To provide the desired viscosity, polymeric gelling agents commonly are added to the treatment fluids. Examples of commonly used polymeric gelling agents include, but are not limited to, guar gums and derivatives thereof, cellulose derivatives, biopolymers, and the like. The use of polymeric gelling agents, however, may be problematic. For instance, these polymeric gelling agents may leave an undesirable residue in the subterranean formation after use. As a result, potentially costly remedial operations may be required to clean up the fracture face and proppant pack. Foamed treatment fluids and emulsion-based treatment fluids have been employed to minimize residual damage, but increased expense and complexity often result.

To combat these problems associated with polymeric gelling agents, some surfactants have been used as gelling agents. Certain surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein.

As a result, these treatment fluids exhibiting viscoelastic behavior may be used in a variety of subterranean treatments where a viscosified treatment fluid may be useful. Because the micelles may be sensitive to the pH and hydrocarbons, the viscosity of these treatment fluids may be reduced after introduction into the subterranean formation without the need for conventional gel breakers (e.g., oxidizers). This may allow a substantial portion of the treatment fluid to be produced back from the formation without the need for expensive remedial treatments. However, surfactants used heretofore as gelling agents tend to have undesirable environmental characteristics (e.g., toxicity) and/or may be limited by strict environmental regulations in certain areas of the world.

SUMMARY

The present invention relates to methods and compositions for treating subterranean formations. More particularly, the present invention relates to treatment fluids that comprise a MES surfactant, and associated methods.

An embodiment of the present invention provides a method of treating a subterranean formation, the method comprising: providing a treatment fluid comprising an aqueous base fluid, a water-soluble salt, and a MES surfactant; and introducing the treatment fluid into a well bore that penetrates the subterranean formation.

Another embodiment of the present invention provides a method of fracturing a subterranean formation, the method comprising: providing a treatment fluid, the treatment fluid comprising an aqueous base fluid, a water-soluble salt, and a MES surfactant, wherein the treatment fluid exhibits viscoelastic behavior due, at least in part, to the association of at least a portion of the MES surfactant into a plurality of micellar structures; and introducing the treatment fluid into a well bore that penetrates the subterranean formation at or above a pressure sufficient to create or enhance one or more fractures in a portion of the subterranean formation.

Another embodiment of the present invention provides a method of removing formation particulates from a well bore or a near well bore region, the method comprising: providing a treatment fluid, the treatment fluid comprising an aqueous base fluid, a water-soluble salt, and a MES surfactant, wherein the treatment fluid exhibits viscoelastic behavior due, at least in part, to the association of at least a portion of the MES surfactant into a plurality of micellar structures; and introducing the treatment fluid into the well bore so as to suspend a plurality of formation particulates in the treatment fluid.

The features and advantages of the present invention will be readily apparent to those skilled in the art upon a reading of the description of the preferred embodiments that follows.

DRAWINGS

A more complete understanding of the present disclosure and advantages thereof may be acquired by referring to the following description taken in conjunction with the accompanying drawings, wherein.

Figure 1:
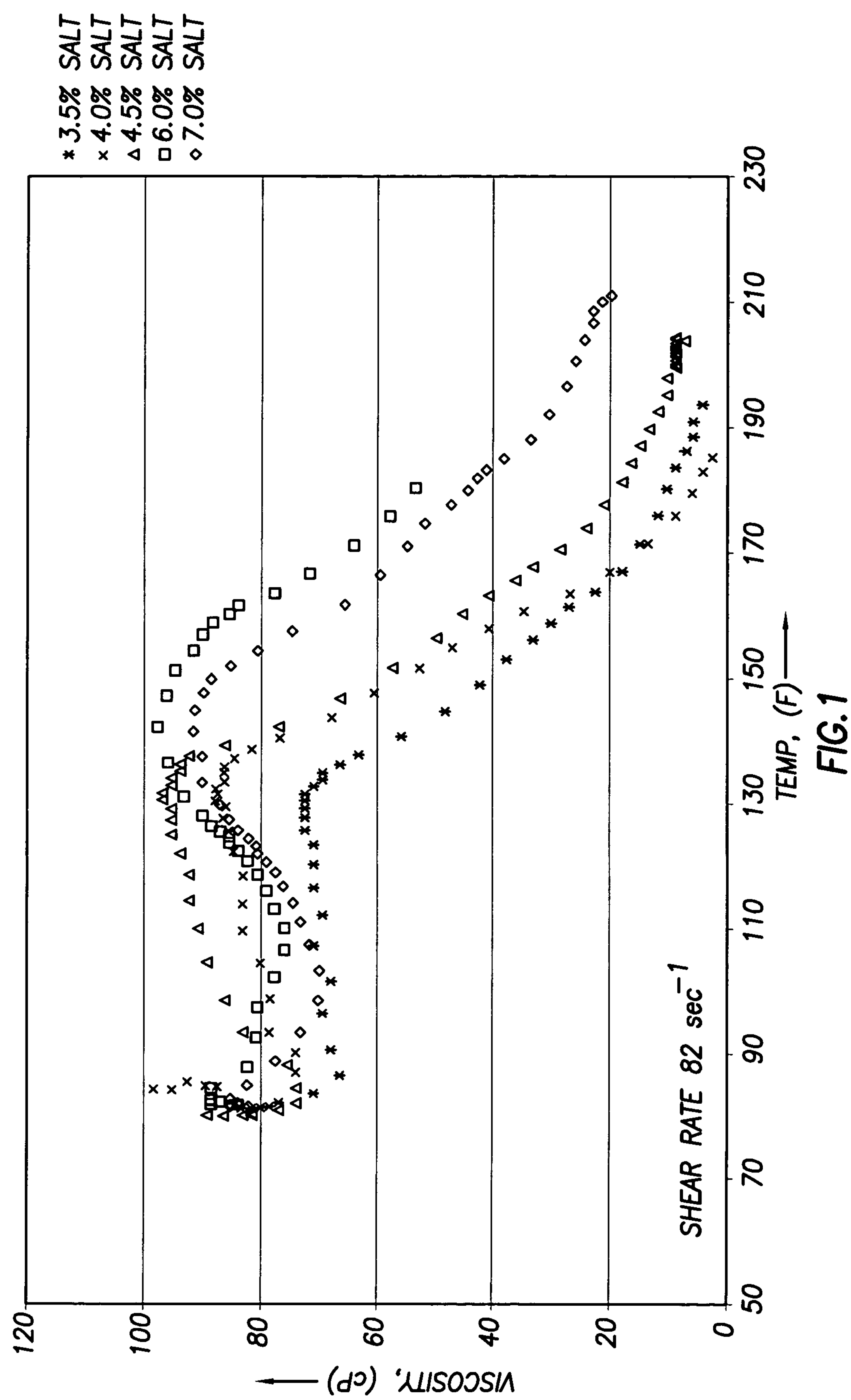
FIG. 1 is a plot of temperature versus viscosity as measured using a nonscanning shear rate procedure on a Fann Model 50 viscometer for sample fluids that comprises a MES surfactant and concentrations of sodium chloride.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to methods and compositions for treating subterranean formations. More particularly, the present invention relates to treatment fluids that comprise a MES surfactant, and associated methods.

The treatment fluids of the present invention generally comprise a MES surfactant, an aqueous base fluid, and a water-soluble salt. In some instances, the treatment fluids of the present invention may exhibit viscoelastic behavior which may be due, at least in part, to the association of at least a portion of the MES surfactant into a plurality of micellar structures. Additionally, other additives suitable for use in the particular application may be included in the treatment fluids of the present invention as recognized by one of ordinary skill in the art having the benefit of this disclosure.

The MES surfactants suitable for use in the present invention are described by the following formula:

Formula I

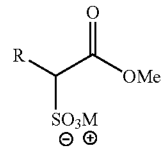

where R is an alkyl chain of from about 10 carbon atoms to about 30 carbon atoms. In some embodiments, R is an alkyl chain of from about 16 carbon atoms to about 22 carbon atoms. An example of a suitable MES surfactant of Formula I is a palm-oil derivative commercially available from Halliburton Energy Services, Inc., Duncan, Okla., under the trade name EFS™-4 surfactant. MES surfactants are believed to be relatively environmentally benign, in most instances, because these surfactants are biodegradable in most environments. The MES surfactants of Formula I are a class of anionic surfactants that have been found to cause fluids to exhibit viscoelastic properties. It is believed that, when the MES surfactant is dissolved in an aqueous environment having a certain ionic strength, the MES surfactant molecules (or ions) may associate to form micelles because of their hydrophobic and hydrophilic regions. These micelles may be rod-shaped, worm-shaped, or any of a variety of other shapes that will viscosify a fluid where present in sufficient concentrations. These micelles, among other things, may increase the viscosity of the fluid therein.

In the presence of a sufficient amount of hydrocarbons or at a certain ionic strength, these micelles may become unstable, thereby disassociating or forming a micellar structure that is not conducive to viscosifying a fluid. This disassociation and/or modification of the micellar structure leads to a reduction in viscosity for the treatment fluid.

The MES surfactant should be present in an embodiment of a treatment fluid of the present invention in an amount sufficient to provide the desired viscosity (e.g., sufficient for particulate transport, etc.) therein through formation of the desired micelles. In certain embodiments, the MES surfactant may be present in the fluids in an amount of from about 0.5% to about 15% by weight of the treatment fluid ("bwof"). In certain exemplary embodiments, the MES surfactant may be present in the treatment fluids of the present invention in an amount of from about 0.5% to about 5% bwof. One of ordinary skill in the art, with the benefit of this disclosure, will be able to determine the appropriate amount of the MES surfactant to include in a treatment fluid of the present invention based on a number of factors, including the amount and type of the one or more salts used, the desired viscosity, the ionic strength of the fluid, and/or the amount and type of co-surfactant employed.

The aqueous base fluid used in the treatment fluids of the present invention may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability of the treatment fluids of the present invention.

To provide the ionic strength for the desired micelle formation, the treatment fluids of the present invention comprise a water-soluble salt. Adding a salt may promote micelle formation for the viscosification of the fluid. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocynate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide. In certain embodiments, the water-soluble salt may be present in the treatment fluids of the present invention in an amount in the range of from about 1% to about 10% bwof. In certain other embodiments, the water-soluble salt may be present in the treatment fluids of the present invention in an amount in the range of from about 5% to about 10% bwof.

The treatment fluids may optionally comprise a co-surfactant, among other things, to facilitate the formation of and/or stabilize a foam, increase salt tolerability, and/or stabilize the treatment fluid. The co-surfactant may comprise any surfactant suitable for use in subterranean environments that does not adversely affect the treatment fluid. Examples of suitable co-surfactants include betaines (e.g., cocobetaine, cocoamidopropylbetaine), amine oxides, derivatives thereof, and combinations thereof. One of ordinary skill in the art will be able to determine which co-surfactants are best suited to the particular embodiments and applications of the compositions and methods described herein. For example, in some embodiments, the treatment fluids may be foamed by injection of a gas therein, wherein a co-surfactant (such as a cocobetaine) is included in treatment fluids to facilitate the formation of and/or stabilize the foam. In some embodiments, the co-surfactant may act to at least partially stabilize the treatment fluid. Generally, the co-surfactants may be present an amount sufficient to optimize the performance of the treatment fluid in a particular application, as determined by one of ordinary skill in the art. In one embodiment, for example, where the co-surfactant is included to increase salt tolerability or to stabilize the treatment fluids of the present invention, the co-surfactant is present in a co-surfactant-to-MES surfactant weight ratio in the range of from about 1:3 to about 3:1.

The treatment fluids of the present invention may further comprise particulates (such as proppant particulates or gravel particulates) suitable for use in subterranean applications. Particulates suitable for use in the present invention may comprise any material suitable for use in subterranean operations. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of the present invention may be coated with any suitable resin or tackifying agent known to those of ordinary skill in the art.

The treatment fluids of the present invention may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range and thereby maintain, or provide, the necessary ionic strength to form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the present invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

The treatment fluids of the present invention may optionally comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam a treatment fluid of the present invention using a gas, such as air, nitrogen, or carbon dioxide. In another embodiment, it may be desired to include an acid in the treatment fluid. It has been determined that inclusion of hydrochloric acid in amounts greater than about 15% by weight of the aqueous base fluid may impact viscosification. In one certain embodiment, the treatment fluids of the present invention may contain a particulate additive, such as a particulate scale inhibitor. Individuals skilled in the art, with the benefit of this disclosure, will recognize the types of additives that may be necessary for inclusion in the treatment fluids of the present invention for a particular application.

The treatment fluids of the present invention may be prepared by any suitable method. In some embodiments, the treatment fluids may be prepared on the job site. As an example of such an on-site method, a MES surfactant may be combined with an aqueous base fluid and one or more salts. As previously mentioned, the one or more salts should provide sufficient ionic strength to promote the desired micelle formation, such that the treatment fluid exhibits viscoelastic behavior. In some embodiments, the one or more salts may be combined with the aqueous base fluid prior to their combination with the MES surfactant. In one certain embodiment, an additive for adjusting and/or maintaining pH may be combined with the aqueous base fluid, among other things, to provide or maintain a desired ionic strength. The additive for maintaining and/or adjusting pH may be combined with the aqueous base fluid either prior to, after, or simultaneously with the MES surfactant. Furthermore, additional additives, as discussed above, may be combined with the treatment fluid and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid, the MES surfactant may be combined with a surfactant solubilizer prior to its combination with the other components of the treatment fluid. The surfactant solubilizer may be any suitable surfactant solubilizer, such as water, simple alcohols, and combinations thereof. For example, in some embodiments, the MES surfactant may be provided in a mixture that comprises the surfactant solubilizer and the MES surfactant. One or ordinary skill in the art, with the benefit of this disclosure, will be able to determine other suitable methods for preparation of the treatment fluids.

As previously discussed, at certain conditions, the surfactant molecules present in the treatment fluids may associate to form the desired micelles, which, depending on a number of factors (e.g., MES surfactant concentration), may viscosify the fluid so that it exhibits viscoelastic behavior. The micelles present in the treatment fluids of the present invention are generally sensitive to, among other things, the ionic strength of the fluid, hydrocarbons, and shear stress. Further, they also may be sensitive to temperature. Accordingly, these treatment fluids containing the desired micelles may experience a viscosity decline after introduction into the well bore and/or penetration into the subterranean formation, without the need for external gel breakers. As previously discussed, this viscosity reduction is generally due to the dissociation and/or modification of the micellar structure. For example, in hydrocarbon-containing portions of the subterranean formation, the viscosity of the treatment fluids may be reduced by contact with the hydrocarbons contained therein. Likewise, in certain portions of the subterranean formation (e.g., carbonate formations), the treatment fluids may experience a pH change, thereby facilitating a change in the ionic strength of the fluid. In certain embodiments, dilution of the treatment fluid may also facilitate a reduction in viscosity of the treatment fluid. For example, the treatment fluid may be diluted by contact with formation fluids and/or subsequently injected treatment fluids, thereby reducing the concentration of the desired micelles in the treatment fluid and/or changing the ionic strength of the treatment fluid.

The treatment fluids may be used for carrying out a variety of subterranean treatments, where a viscosified treatment fluid may be used, including, but not limited to, drilling operations, fracturing treatments, and completion operations (e.g., gravel packing). In some embodiments, the treatment fluids of the present invention may be used in treating a portion of a subterranean formation. In certain embodiments, a treatment fluid that comprises an aqueous base fluid, a water-soluble salt, and a MES surfactant may be introduced into a well bore that penetrates the subterranean formation. In some instances, the treatment fluid exhibits viscoelastic behavior which may be due, at least in part, to the association of at least a portion of the MES surfactant into a plurality of micellar structures. Optionally, the treatment fluid further may comprise particulates and other additives suitable for treating the subterranean formation. As previously mentioned, the treatment fluid generally may experience a reduction in viscosity after placement into the well bore. For example, the treatment fluid may be allowed to contact the subterranean formation for a period of time sufficient to reduce the viscosity of the treatment fluid. In some embodiments, the treatment fluid may be allowed to contact hydrocarbons, formations fluids, and/or subsequently injected treatment fluids, thereby reducing the viscosity of the treatment fluid. After a chosen time, the treatment fluid may be recovered through the well bore.

In certain embodiments, the treatment fluids may be used in fracturing treatments. In the fracturing embodiments, a treatment fluid that comprises an aqueous base fluid, a water-soluble salt, and a MES surfactant may be introduced into a well bore that penetrates a subterranean formation at or above a pressure sufficient to create or enhance one or more fractures in a portion of the subterranean formation. Generally, in the fracturing embodiments, the treatment fluid may exhibit viscoelastic behavior which may be due, at least in part, to the association of at least a portion of the MES surfactant into a plurality of micellar structures. Optionally, the treatment fluid further may comprise particulates and other additives suitable for the fracturing treatment. As previously mentioned, the treatment fluid generally may experience a reduction in viscosity after introduction into the subterranean formation. After a chosen time, the treatment fluid may be recovered through the well bore.

In certain embodiments, the treatment fluids of the present invention may be used for providing some degree of sand control in a portion of the subterranean formation. In the sand control embodiments, a treatment fluid that comprises an aqueous base fluid, a water-soluble salt, particulates, and a MES surfactant may be introduced into a well bore that penetrates the subterranean formation such that the particulates form a gravel pack in or adjacent to a portion of the subterranean formation. Generally, in the sand control embodiments, the treatment fluid may exhibit viscoelastic behavior which may be due, at least in part, to the association of at least a portion of the MES surfactant into a plurality of micellar structures. Optionally, the treatment fluid further may comprise other additives suitable for the sand control treatment. In some embodiments, the portion in which some degree of sand control is provided is the same portion of the subterranean formation as the portion that the gravel pack is formed in or adjacent to. As previously mentioned, the treatment fluid generally may experience a reduction in viscosity after introduction into the well bore. Furthermore, any portion of the treatment fluid that leaks off into the formation during the sand control treatment may also experience a reduction in viscosity. After a chosen time, the treatment fluid may be recovered from the well bore.

In certain embodiments, the treatment fluids may be used for removing formation particulates from a well bore or from the near well bore region. These formation particulates may be present in the well bore of the near well bore region for a number of reasons, including instances where the formation particulates are generated during the course of drilling, digging, blasting, dredging, tunneling, and the like in the subterranean formation. For example, the treatment fluid may be used as a drilling fluid that is introduced into the well bore, among other things, to remove drill cuttings from the well bore. In these formation particulate removal embodiments, a treatment fluid that comprises an aqueous base fluid, a water-soluble salt, and a MES surfactant is introduced into the well bore. Generally, the treatment fluid may exhibit viscoelastic behavior which may be due, at least in part, to the association of at least a portion of the MES surfactant into a plurality of micellar structures. The treatment fluid should be introduced into the well bore so that it suspends a plurality of formation particulates in the well bore or in the near well bore region. In these embodiments, the treatment fluid should be recovered from the well bore before the viscosity thereof is substantially reduced so that the treatment fluid has sufficient viscosity to transport the formation particulates out of the well bore. In some embodiments, after recovery from the well bore, the viscosity of the treatment fluid may be reduced, inter alia, so as to facilitate separation of the formation particulates therefrom.

To facilitate a better understanding of the present invention, the following examples of preferred embodiments are given. In no way should the following examples be read to limit, or define, the scope of the invention.

EXAMPLES

Example 1

To determine the viscosification of a treatment fluid using a MES surfactant, laboratory samples were prepared by mixing a MES surfactant (EFS™-4 surfactant) with an aqueous base fluid. The aqueous base fluid used was tap water unless otherwise indicated. In certain samples, a salt was included in the aqueous base fluid. Where included, the concentration and type of salt included in the aqueous base fluid were varied. Once prepared, each sample was observed to determine gel formation. For purposes of this example, a sample was considered gelled if it had a viscosity of greater than about 20 centipoise at 511 $sec^{-1}$. The compositions of each sample and observations thereof are listed in Table 1.

TABLE 1

| Sample No. | MES Concentration[1] (by weight) | Aqueous Base Fluid | Result |
|---|---|---|---|
| 1 | 5% | Water | Not gelled |
| 2 | 5% | Seawater | Gelled |
| 3 | 5% | 5% KCl by wt | Gelled |
| 4 | 5% | 5% NaCl by wt | Gelled |
| 5 | 5% | 10% NaCl by wt | Gelled |
| 6 | 5% | 5% $CaCl_2$ by wt | Gelled |
| 7 | 5% | 10% $CaCl_2$ by wt | Gelled |
| 8 | 5% | 5% NaCl by wt<br>5% $CaCl_2$ by wt | Gelled |
| 9 | 5% | 10% NaCl by wt<br>10% $CaCl_2$ by wt | Gelled |
| 10 | 5% | 5% $NH_4Cl$ by wt | Gelled |
| 11 | 5% | 10% $NH_4Cl$ by wt | Gelled |

[1]Similar results were obtained for each sample when 10% by weight of the MES surfactant was used.

Additionally, further samples were prepared, wherein a sufficient amount of sodium hydroxide was included in the aqueous base fluid so that the pH of the sample was above 7, i.e., the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 2.

TABLE 2

| Sample No. | MES Concentration[2] (by weight) | Aqueous Base Fluid (basified with NaOH to pH 10) | Result |
|---|---|---|---|
| 12 | 5% | 5% NaCl by wt | Gelled |
| 13 | 5% | 10% NaCl by wt<br>5% KCl by wt | Gelled |
| 14 | 5% | 5% $CaCl_2$ by wt | Gelled |
| 15 | 5% | 10% $CaCl_2$ by wt | Gelled |
| 16 | 5% | 5% NaCl by wt<br>5% $CaCl_2$ by wt | Gelled |
| 17 | 5% | 10% NaCl by wt<br>10% $CaCl_2$ by wt | Gelled |
| 18 | 5% | seawater | Gelled |
| 19 | 5% | 5% $NH_4Cl$ by wt | Gelled |

[2]Similar results were obtained for each sample when 10% by weight of the MES surfactant was used.

Additionally, further samples were prepared, wherein a sufficient amount of hydrochloric acid was included in the aqueous base fluid so that the pH of the sample was below 7, i.e., the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 3.

TABLE 3

| Sample No. | MES Concentration[3] (by weight) | Aqueous Base Fluid (acidified with HCl to pH 4) | Result |
|---|---|---|---|
| 20 | 5% | 5% NaCl by wt | Gelled |
| 21 | 5% | 10% NaCl by wt<br>5% KCl by wt | Gelled |

TABLE 3-continued

| Sample No. | MES Concentration[3] (by weight) | Aqueous Base Fluid (acidified with HCl to pH 4) | Result |
|---|---|---|---|
| 22 | 5% | 5% $CaCl_2$ by wt | Gelled |
| 23 | 5% | 10% $CaCl_2$ by wt | Gelled |
| 24 | 5% | 5% NaCl by wt<br>5% $CaCl_2$ by wt | Gelled |
| 25 | 5% | 10% NaCl by wt<br>10% $CaCl_2$ by wt | Gelled |
| 26 | 5% | seawater | Gelled |
| 27 | 5% | 5% $NH_4Cl$ by wt | Gelled |

[3]Similar results were obtained for each sample when 10% by weight of the MES surfactant was used.

Additionally, further samples were prepared wherein the aqueous base fluid contained 15% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 4.

TABLE 4

| Sample No. | MES Concentration[4] (by weight) | Aqueous Base Fluid | Result |
|---|---|---|---|
| 28 | 5% | 15% HCl | Not gelled |
| 29 | 5% | 15% HCl<br>5% NaCl by wt | Not gelled |
| 30 | 5% | 15% HCl<br>5% KCl by wt | Not gelled |
| 31 | 5% | 15% HCl<br>5% $CaCl_2$ by wt | Not gelled |
| 32 | 5% | 15% HCl<br>5% $NH_4Cl$ by wt | Not gelled |

[4]Similar results were obtained for each sample when 10% by weight of the MES surfactant was used.

Additionally, further samples were prepared wherein the aqueous base fluid contained 10% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 5.

TABLE 5

| Sample No. | MES Concentration (by weight) | Aqueous Base Fluid | Result |
|---|---|---|---|
| 33 | 5% | 10% HCl | Gelled |
| 34 | 5% | 10% HCl<br>5% NaCl by wt | Gelled |
| 35 | 5% | 10% HCl<br>5% KCl by wt | Gelled |
| 36 | 5% | 10% HCl<br>5% $CaCl_2$ by wt | Gelled |
| 37 | 5% | 10% HCl<br>5% $NH_4Cl$ by wt | Gelled |

Additionally, further samples were prepared, wherein a sufficient amount of sodium hydroxide was included in the aqueous base fluid so that the pH of the sample was above 7, i.e., the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 6.

TABLE 6

| Sample No. | MES Concentration (by weight) | Aqueous Base Fluid (basified with NaOH to pH 10) | Result |
|---|---|---|---|
| 38 | 5% | 5% $CaCl_2$ by wt | Gelled |
| 39 | 5% | 5% $MgCl_2$ by wt | Gelled |
| 40 | 5% | 5% $CaCl_2$ by wt<br>5% $MgCl_2$ by wt | Gelled |

Additionally, further samples were prepared, wherein a sufficient amount of hydrochloric acid was included in the aqueous base fluid so that the pH of the sample was below 7, i.e., the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 7.

TABLE 7

| Sample No. | MES Concentration (by weight) | Aqueous Base Fluid (acidified with HCl to pH 4) | Result |
|---|---|---|---|
| 41 | 5% | 5% $CaCl_2$ by wt | Gelled |
| 42 | 5% | 5% $MgCl_2$ by wt | Gelled |
| 43 | 5% | 5% $CaCl_2$ by wt<br>5% $MgCl_2$ by wt | Gelled |

Thus, Example 1 indicates that a MES surfactant may be used to viscosify a fluid.

Example 2

Rheological tests were performed on laboratory samples that were prepared as follows. Samples were prepared by mixing water with the following components: an MES surfactant in an amount of about 1.5% by weight of the sample; a cocobetaine in an amount of about 1.5% by weight of the sample component; and various concentrations of sodium chloride (3.5%, 4.0%, 4.5%, 6.0%, and 7.0%). The MES surfactant included in the samples was an alpha-sulfo fatty acid methyl ester that is commercially available as ALPHA-STEP XMP-66® from Stepan Company, Northfield, Ill. Further, the cocobetaine used in the samples is commercially available as Witco Rewoteric AM B-13®.

Once prepared, the samples were each placed in the R1 rotor cup of a Fann Model 50 viscometer to determine the viscosities of the sample, utilizing a nonscanning shear rate procedure. The rotor cups containing the samples were set in motion at a constant rate of about 95 rpm providing a shear rate of about 82 $sec^{-1}$ on the sample. The sample was brought up to about 230° F. as the viscosities of the samples were measured. A plot of temperature (° F.) versus viscosity (cP) for each sample is provided in FIG. 1. Table 8 identifies the maximum viscosities and corresponding temperatures for each sample.

TABLE 8

| NaCl Concentration (by weight) | Max Viscosity (cP) | Temperature (° F.) |
|---|---|---|
| 3.5% | 73 | 133 |
| 4.0% | 88 | 132 |
| 4.5% | 97 | 132 |
| 6.0% | 98 | 142 |
| 7.0% | 92 | 141 |

Thus, Example 2 illustrates that a MES surfactant may be used to viscosify a fluid.

Example 3

Rheological tests were performed on laboratory samples that were prepared as follows. Two samples were prepared by mixing water with the following components: an MES surfactant in an amount of about 5% by weight of the sample with about 5% sodium chloride. Sample A was used without adjusting the pH. The pH of Sample B was adjusted with NaOH to about 10. The MES surfactant included in the samples was an alpha-sulfo fatty acid methyl ester that is commercially available as EFS™-4 Surfactant from Halliburton Energy Services, Inc., Duncan, Okla.

Figure 2:
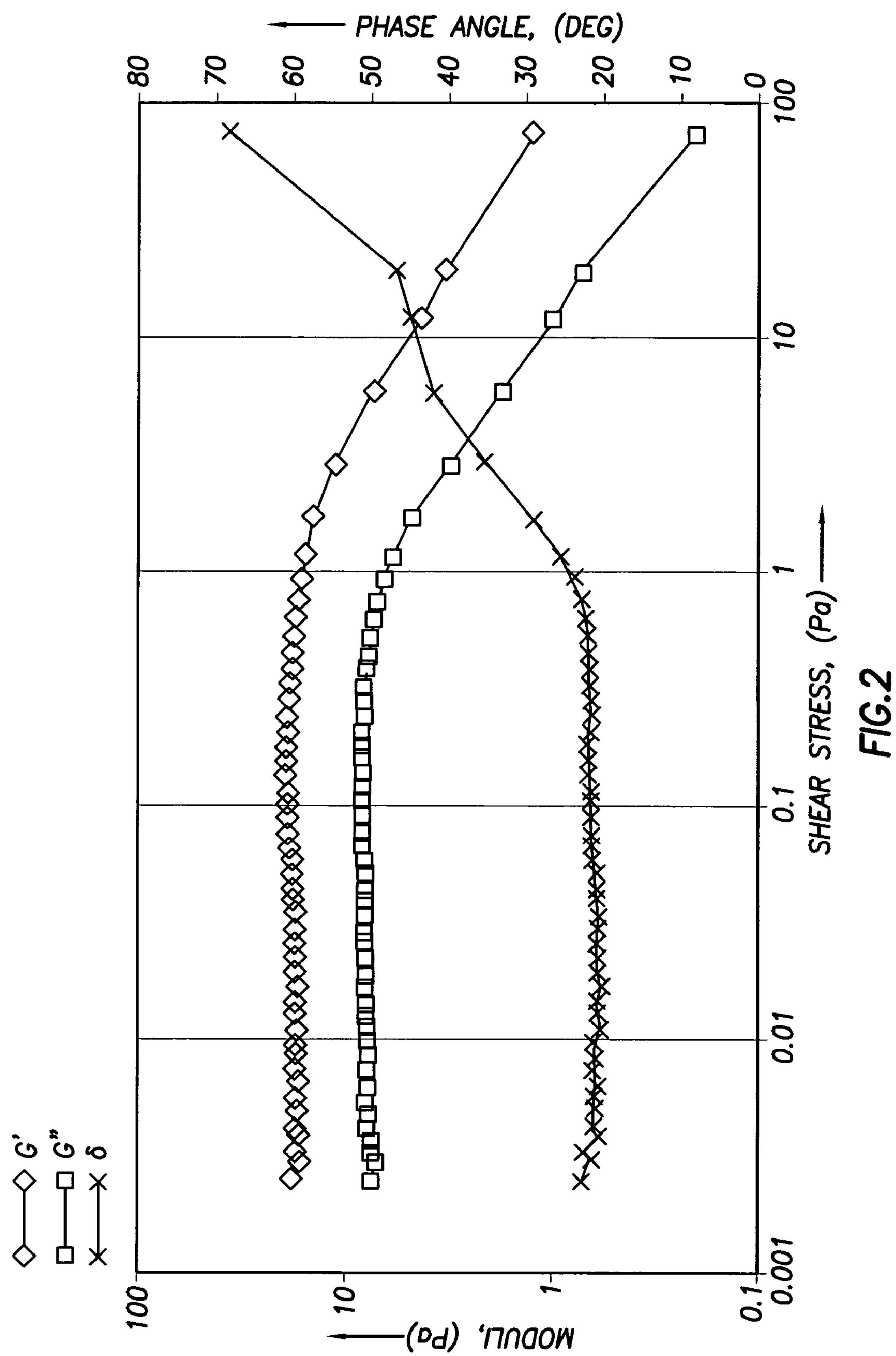
FIG. 2 is a plot of shear stress versus storage modulus, loss modulus, and phase angle as measured using a Haake Rheostress RS150 stress-controlled rheometer for a sample fluid that comprises a MES surfactant and sodium chloride.
Figure 3:
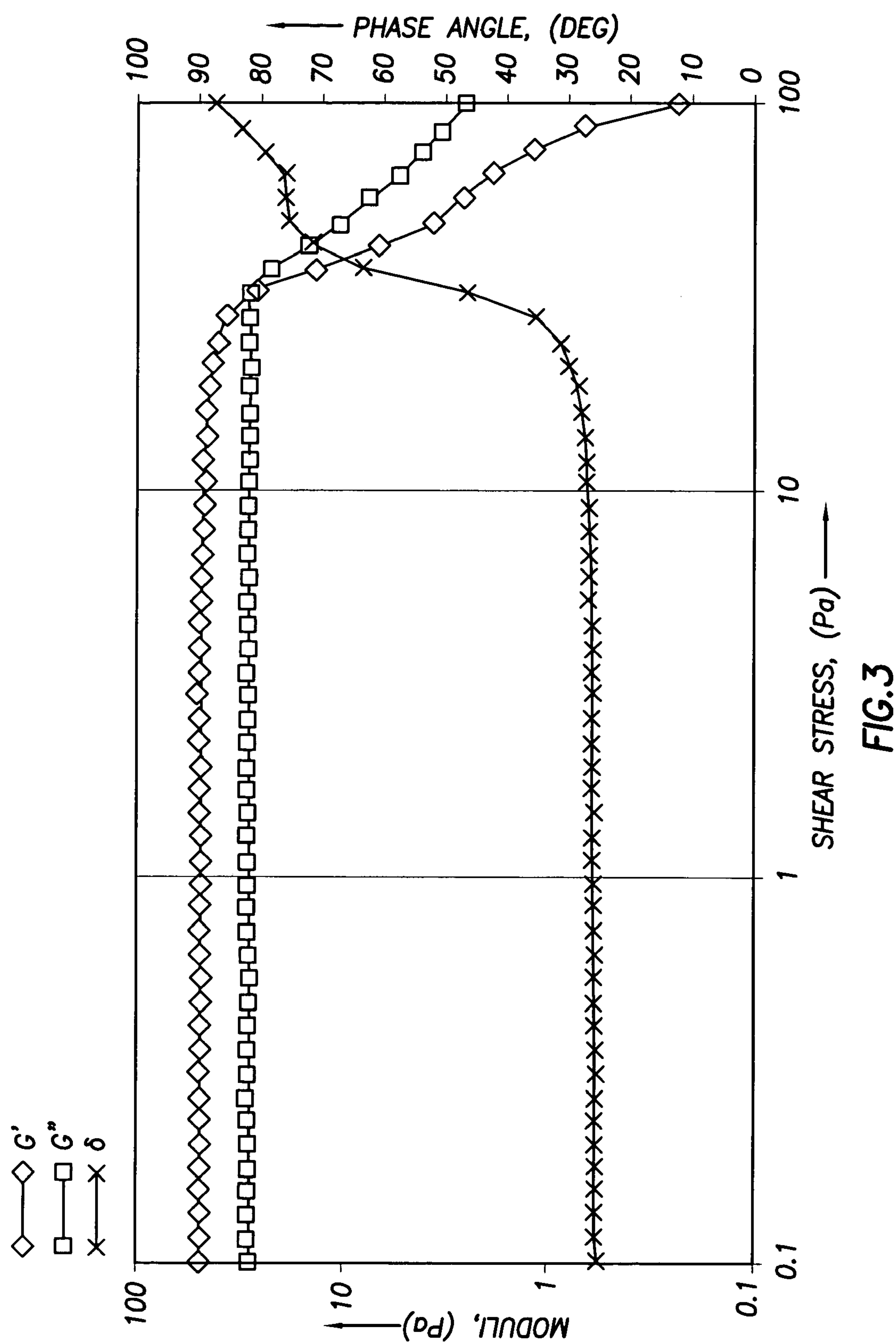
FIG. 3 is a plot of shear stress versus storage modulus, loss modulus, and phase angle as measured using a Haake Rheostress RS150 stress-controlled rheometer for another sample fluid that comprises a MES surfactant and sodium chloride.

Once the samples were prepared, the rheology was determined using a Haake RheoStress RS150 stress-controlled rheometer fitted with a 60 mm diameter, 2° cone and plate. The temperature was held constant at 25° C. A constant frequency (1 Hz) oscillatory stress sweep was performed over the stress range indicated to obtain the storage modulus (G'), loss modulus (G"), and phase angle (δ). Results are shown in FIGS. 2 and 3 for Samples A and B, respectively.

Thus, Example 3 illustrates that a MES surfactant may be used to viscosify a fluid.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims. The terms in the claims have their plain, ordinary meaning unless otherwise defined by the patentee.

What is claimed is:

1. A method of treating a subterranean formation, the method comprising:

providing a treatment fluid comprising:

an aqueous base fluid;

a water-soluble salt; and a methyl ester sulfonate surfactant having the following formula:

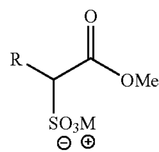

where R is an alkyl chain of about 10 carbon atoms to about 30 carbon atoms; and introducing the treatment fluid into a well bore that penetrates the subterranean formation.

2. The method of claim 1 wherein the treatment fluid exhibits viscoelastic behavior due, at least in part, to the association of at least a portion of the methyl ester sulfonate surfactant into a plurality of micellar structures.

3. The method of claim 1 wherein the water-soluble salt comprises at least one water-soluble salt selected from the group consisting of:

ammonium chloride; lithium bromide; lithium chloride; lithium formate; lithium nitrate; calcium bromide; calcium chloride; calcium nitrate; calcium formate; sodium bromide; sodium chloride; sodium formate; sodium nitrate; potassium chloride; potassium bromide; potassium nitrate; potassium formate; cesium nitrate; cesium formate; cesium chloride; cesium bromide; magnesium chioride; magnesium bromide; zinc chloride; zinc bromide; any combination thereof; and any derivative thereof.

4. The method of claim 1 wherein the methyl ester sulfonate surfactant is present in the treatment fluid in an amount of from about 0.5% to about 15% by weight of the treatment fluid.

5. The method of claim 1 wherein R is an alkyl chain of from about 16 carbon atoms to about 22 carbon atoms.

6. The method of claim 1 wherein the treatment fluid further comprises at least one component selected from the group consisting of: particulates; a co-surfactant; an additive for adjusting and/or maintaining PH; an acid; a fluid loss control additive; a gas; a corrosion inhibitor; a scale inhibitor; a catalyst; a clay control agent; a biocide; and a friction reducer; and any combination thereof.

7. The method of claim 6 wherein the particulates comprise at least one material selected from the group consisting of: sand; bauxite;

a ceramic material; a glass material; a polymer material; a polytetrafluoroethylene material; a nut shell piece; a cured resinous particulate comprising at least one nut shell piece; a seed shell piece; a cured resinous particulate comprising at least one seed shell piece; a fruit pit piece; a cured resinous particulate comprising at least one fruit pit piece; wood; a composite particulate; and any combination thereof.

8. The method of claim 6 wherein the particulates are coated with a resin a tackifying agent, and any combination thereof.

9. The method of claim 6 wherein the co-surfactant is comprises at least one co-surfactant selected from the group consisting of: a betaine; an amine oxide; any combination thereof; and any derivative thereof.

10. The method of claim 6 wherein the co-surfactant is present in the treatment fluid in a co-surfactant-to-methyl ester sulfonate surfactant weight ratio in the range of from about 1:3 to about 3:1.

11. The method of claim 1 further comprising allowing the treatment fluid to contact the subterranean formation for a period of time sufficient to reduce the viscosity of the treatment fluid.

12. The method of claim 1 further comprising allowing the treatment fluid to contact hydrocarbons contained in the subterranean formation, a formation fluid, and/or a treatment fluid, thereby reducing the viscosity of the treatment fluid.

13. The method of claim 1 further comprising recovering the treatment fluid through the well bore.

14. A method of fracturing a subterranean formation, the method comprising:

providing a treatment fluid, the treatment fluid comprising:

an aqueous base fluid;

a water-soluble salt; and a methyl ester sulfonate surfactant having the following formula:

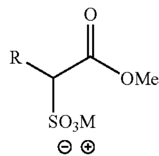

where R is an alkyl chain of about 10 carbon atoms to about 30 carbon atoms, wherein the treatment fluid exhibits viscoelastic behavior due, at least in part, to the association of at least a portion of the methyl ester sulfonate surfactant into a plurality of micellar structures; and introducing the treatment fluid into a well bore that penetrates the subterranean formation at or above a pressure sufficient to create or enhance one or more fractures in a portion of the subterranean formation.

15. The method of claim 14 further comprising allowing the treatment fluid to contact hydrocarbons contained in the subterranean formation, a formation fluid, and/or a treatment fluid, thereby reducing the viscosity of the treatment fluid.

16. The method of claim 14 further comprising allowing the treatment fluid to contact the subterranean formation for a period of time sufficient to reduce the viscosity of the treatment fluid.

17. The method of claim 14 wherein the treatment fluid further comprises at least one component selected from the group consisting of: particulates; a co-surfactant; an additive for adjusting and/or maintaining pH; an acid; a fluid loss control additive; a gas; a corrosion inhibitor; a scale inhibitor; a catalyst; a clay control agent; a biocide; a friction reducer; and any combination thereof.

18. A method of removing formation particulates from a well bore or a near well bore region, the method comprising:

providing a treatment fluid, the treatment fluid comprising:

an aqueous base fluid;

a water-soluble salt; and a methyl ester sulfonate surfactant having the following formula:

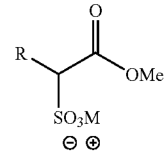

where R is an alkyl chain of about 10 carbon atoms to about 30 carbon atoms, wherein the treatment fluid exhibits viscoelastic behavior due, at least in part, to the association of at least a portion of the methyl ester sulfonate surfactant into a plurality of micellar structures; and introducing the treatment fluid into the well bore so as to suspend a plurality of formation particulates in the treatment fluid.

19. The method of claim 18 wherein the formation particulates comprise drill cuttings.

20. The method of claim 18 wherein the treatment fluid further comprises at least one component selected from the group consisting of:

particulates; a co-surfactant; an additive for adjusting and/or maintaining pH; an acid; a fluid loss control additive; a gas; a corrosion inhibitor; a scale inhibitor; a catalyst; a clay control agent; a biocide; a friction reducer; and any combination thereof.

* * * * *